Figure 1:
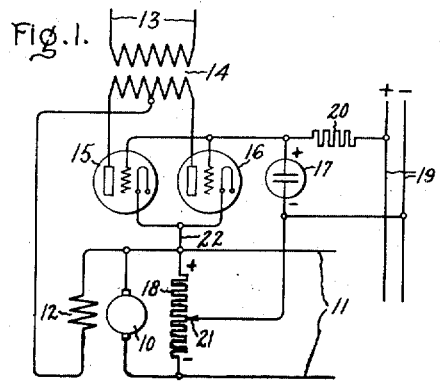

Feb. 18, 1936.                    H. T. SEELEY                    2,031,509
                              ELECTRIC CONTROL MEANS
                                Filed Jan. 25, 1934

Inventor:
Harold T. Seeley,
by Harry E. Dunham
His Attorney.

Patented Feb. 18, 1936

2,031,509

UNITED STATES PATENT OFFICE 2,031,509

ELECTRIC CONTROL MEANS

Harold T. Seeley, Lansdowne, Pa., assignor to General Electric Company, a corporation of New York Application January 25, 1934, Serial No. 708,245

13 Claims. (Cl. 171—312)

My invention relates to electric control means and more particularly to regulating or control systems employing electric discharge devices or electric valves for controlling a dynamo-electric machine or electric circuit.

The regulating unit of many automatic regulating systems consists of a constant element which determines the value of the condition to be maintained, an element varying in accordance with the variable condition which is balanced against the constant element, and means operative in accordance with variations from the balanced condition for bringing the regulated or controlled condition to a predetermined value. In mechanical types of regulators it has been common to use a spring in which the modulus of elasticity of the spring is the constant element. In electrical types of regulators it has been proposed to use sources of constant electromotive force, such as a battery, or the critical break-down voltage of an electric discharge device, such as a glow tube, as the constant element. A constant voltage battery is theoretically a satisfactory constant element of a regulating system but batteries have well known disadvantages for commercial applications. The glow-tube utilizing the break-down voltage as a standard of reference has been found to possess certain desirable features in regulating systems, but I have found that the voltage drop across the tube is much more nearly constant than the break-down voltage and therefore it is a better standard of voltage for use in regulating systems.

In accordance with my invention, I employ a current consuming device, such as an electric discharge device, which has a substantially constant voltage drop thereacross when in a continuously conducting state, as the constant element of my regulating system, and differentially relate the component of voltage across the current consuming device with a component of voltage varying in accordance with the condition to be controlled or regulated so that the algebraic value of the voltage difference thereby produced is caused to vary the energization of the means for effecting the desired control or regulation. A satisfactory means for effecting the control or regulation comprises vapor electric valves of the grid control type wherein the grid potential of the valves is varied by the voltage difference to vary the conductivity of the electric valves.

It is an object of my invention to provide an improved arrangement for controlling or regulating a machine or electric circuit with a high order of accuracy.

It is another object of my invention to provide improved circuit control means employing an electric discharge device which is applicable for use in regulating or controlling alternating or direct current circuits or machines.

It is a further object of my invention to provide an improved system of regulation for alternating or direct current circuits or machines.

My invention will be better understood from the following description taken in connection with the accompanying drawing and its scope will be pointed out in the appended claims.

Figure 2:
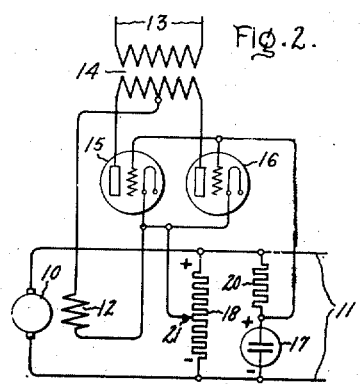
Figure 3:
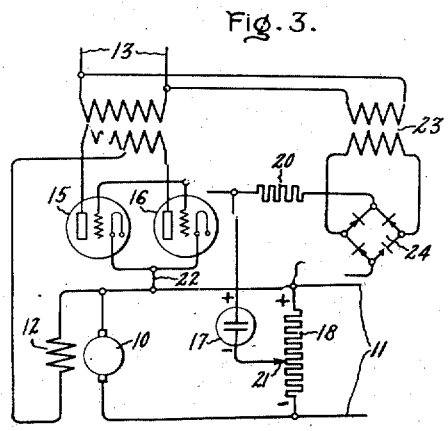
Figure 4:
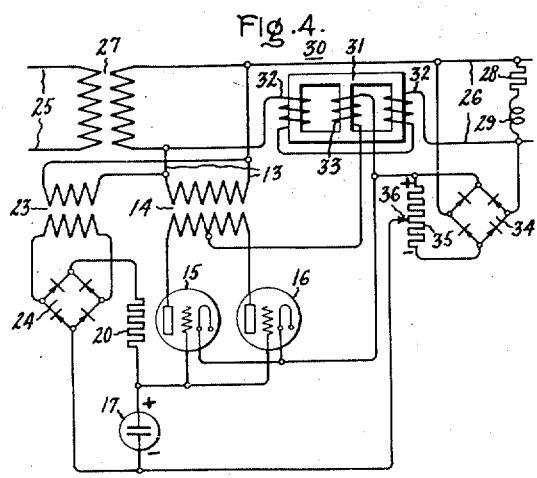
Figure 5:
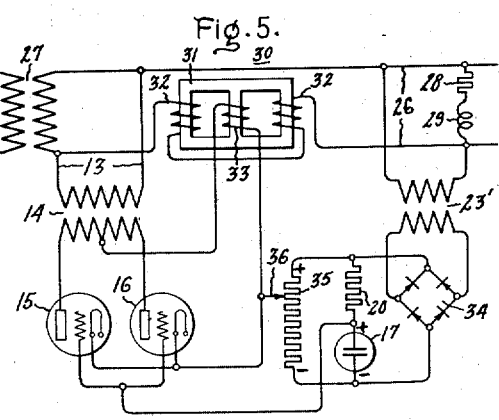

In the drawing, Fig. 1 is a diagrammatic representation of an embodiment of my invention in a regulating system for a direct current dynamo-electric machine; Figs. 2 and 3 are modifications of the arrangement illustrated in Fig. 1; Fig. 4 is a diagrammatic representation of an embodiment of my invention for an alternating current circuit; and Fig. 5 is a modification of the arrangement illustrated in Fig. 4.

Referring to Fig. 1 of the drawing, 10 denotes a dynamo-electric machine shown as a direct current generator which is connected to a power circuit 11. The generator 10 is provided with an excitation circuit indicated by the field winding 12 which is connected to be energized from a source of current indicated by the conductors 13 through electric valves of the type in which the conductivity may be varied by means of a control electrode circuit. The illustrated means for energizing field winding 12 includes a transformer 14 connected to be energized from the alternating current conductors 13 and a pair of electric valves 15 and 16 connected to form a full wave rectifier with the field winding 12 included in the direct current circuit of the rectifier. As will be understood by those skilled in the art, the valves 15 and 16 are each provided with an anode, a cathode and a control electrode circuit or grid circuit and may be of the several types well known in the art, although I prefer to use valves of the gaseous or vapor electric discharge type.

The circuit for effecting control or detecting changes in a condition to be controlled comprises a current consuming device illustrated as an electric discharge device 17 which has a substantially constant voltage drop thereacross when in a continuously conducting state, as the constant element of the circuit, connected in differential voltage relation with a variable component of voltage which may be varied in accordance with the control or regulation to be effected. The electric discharge device 17 may be of the type known in the art as a glow tube comprising two spaced electrodes in a suitable envelope containing inert gas at a pressure such that the tube has a substantially constant drop thereacross when in a continuously conducting state. As illustrated, a component of voltage varying in accordance with the voltage to be regulated is obtained from a resistor 18 which is connected across the generator power circuit 11. Since the break-down voltage of a glow tube is always higher than its continuous operating voltage it is necessary to impress a voltage across the tube which is sufficient to initiate and maintain a discharge through the tube before the voltage corresponding to the regulated condition rises to its normal value. In the arrangement illustrated in Fig. 1, I have shown an auxiliary circuit indicated by conductors 19 which may be any convenient source of direct voltage sufficient to initiate and maintain discharge through the tube. The tube 17 is connected to be energized from the circuit 19 through a current limiting resistor 20. One side of the tube 17 is connected to the grids of the electric valves 15 and 16 and the other side is connected to a point on the resistor 18 through an adjustable connection 21. A connection 22 is made between the cathode circuit of the valves 15 and 16 and one side of the resistor 18. The grid-cathode circuit of the valves is then completed from the grids through the tube 17, to the connection 21 on the resistor 18, through the resistor 18 and connection 22 to the cathodes.

The operation of the arrangement illustrated in Fig. 1 is substantially as follows: It will be assumed that the upper terminal of resistor 18 as viewed in the drawing is positive polarity and that the polarity at the connection 21 is negative relative to the upper point. It will also be assumed that the voltage component across tube 17 is positive polarity at the upper terminal and negative polarity at the lower terminal. Under these conditions it will be observed that the voltage component across resistor 18 is in opposition to the voltage component across tube 17 so that the grid potential of the valves 15 and 16 depends upon the relative magnitudes of the respective voltage components.

The electric valves 15 and 16, as previously stated, are preferably of the vapor electric type. In electric valves of this type with a given applied plate voltage there is a particular grid voltage at which ionization will just occur thus allowing the tube to pass current. If the grid potential is below this critical potential, i. e., more negative, no discharge will occur and no current will pass. As soon as the grid potential is increased above the critical voltage, ionization occurs and the tube passes current, providing the anode is positive with respect to the cathode. There are a number of known methods of controlling the grids of vapor electric valves but the methods may be classified into two general classes as the voltage magnitude method and the phase shift method. It will be apparent that my invention is not limited to a particular method of grid control and I have chosen to illustrate the voltage magnitude method for purposes of more simply and clearly disclosing my invention. Thus, if the voltage component across resistor 18 is less than the voltage component across the electric valve 17, the grid potential of the valves 15 and 16 is arranged to be of such a value as to render these valves conductive. On the other hand when the voltage component across resistor 18 exceeds the voltage component across the valve 17 the grid potential becomes more negative and the valves 15 and 16 become non-conductive. The resulting intermittent conductivity of the valves produces an average current in the field circuit which maintains the voltage of the generator at a constant value depending upon the initial adjustment of the voltage component derived from resistor 18.

In the event that the control voltage or voltage to be regulated is above the critical break-down voltage of the electric discharge device 17, it will not be necessary to employ the auxiliary source of voltage 19, and the circuit control means may be arranged as shown in the modification illustrated in Fig. 2. In Fig. 2 the elements of this arrangement which correspond to the same elements of Fig. 1 are designated by like reference numerals. The electric discharge device 17 and its current limiting resistor 20 are directly connected across the circuit 11. The cathodes of the valves 15 and 16 are connected to the adjustable connection 21 on resistor 18 and the grids are connected to a point between the electric discharge device 17 and its resistor 20. With this connection a variable voltage component from resistor 18 is connected in voltage opposition with the voltage component across device 17 so that the grid circuits of valves 15 and 16 are energized in accordance with the difference between the two voltage components.

The operation of the modification illustrated in Fig. 2 will be substantially the same as that described for the embodiment of my invention illustrated in Fig. 1 and it is believed that no further explanation will be necessary for a clear understanding of this embodiment of my invention.

Fig. 3 illustrates another modification of the embodiment of my invention shown in Fig. 1 with respect to the method of initiating and maintaining continuous operation of the tube 17 in case the voltage applied across resistor 18 is below the critical break-down voltage of tube 17. The elements of this embodiment which correspond to the same elements of Fig. 1 are designated by like reference numerals for purposes of simplifying the comparison of the two arrangements. In this case the additional voltage to be added to the regulated voltage for initiating and maintaining continuous operation of the tube 17 is obtained from the alternating current source 13 through a transformer 23 and a rectifier 24 shown for purposes of simplicity as a bridge rectifier comprising rectifiers of the contact type. The output voltage of rectifier 24 is added to the positive side of the regulated voltage by connecting the negative terminal of the rectifier to the upper terminal of resistor 18 and the positive terminal of the rectifier through current limiting resistor 20 to one side of the tube 17, while the other side of tube 17 is connected through the adjustable connection 21 to a suitable point on resistor 18. The grids of valves 15 and 16 are connected to the positive side of the tube 17, while the cathode circuit, as in Fig. 1, is connected by means of the conductor 22 to the upper terminal of resistor 18.

The operation of the arrangement shown in Fig. 3 will be readily understood from the description of the operation of the arrangement shown in Fig. 1 since the only difference between these two arrangements is the method of initiating and maintaining continuous operation of tube 17.

Fig. 4 illustrates an embodiment of my invention as applied to an alternating current circuit with the elements which correspond to the same elements in Figs. 1 and 2 designated by like reference numerals. While it will be apparent to those skilled in the art that my invention may be applied to alternating dynamo-electric machines as well as direct current dynamo-electric machines without departing from my invention in its broader aspects, I have chosen to illustrate this embodiment of my invention as applied to alternating current circuits for a distribution system, wherein the voltage is to be maintained substantially constant at some selected point on a feeder circuit. A supply circuit 25 is connected to energize a feeder circuit 26 through a step-down transformer 27. A load circuit diagrammatically represented by a resistance 28 and an inductance 29 is connected to be energized from the feeder circuit 26. The means for effecting control is illustrated as a saturable reactor 30 comprising a three-legged core structure 31 with alternating windings 32 connected in series relation with one of the conductors 26 and a direct current saturating winding 33 connected to be energized through the same type of rectifying arrangement as is shown in Figs. 1 and 2. In this case the supply circuit 13 of the rectifying arrangement is connected to be energized from the feeder circuit 26. Similarly to the arrangement shown in Fig. 3, the tube 17 is connected to be energized from the circuit 13 through the transformer 23 and rectifier 24. The positive side of the tube 17 is connected to the grids of the valves 15 and 16. For obtaining a voltage component carrying in accordance with the condition to be regulated, I connect suitable rectifying means 34, illustrated as a bridge rectifier comprising rectifiers of the contact type, across the feeder 26 at the point at which the voltage is to be maintained constant. The output terminals of rectifier 34 are connected across a resistor 35 in order to provide a means of selecting an appropriate voltage for comparison with the standard of reference. The upper, or positive, side of the resistor 35 is connected to the cathodes of the valves 15 and 16 and a lower or more negative point on resistor 35 is connected through an adjustable connection 36 to the lower or negative side of the tube 17. There is thus provided in the grid-cathode circuit of valves 15 and 16, a constant voltage component and a variable voltage component connected in opposition so as to provide a difference voltage which varies the grid potential in accordance with the variations in magnitude of the variable component and thus renders the valves 15 and 16 conductive or non-conductive.

The operation of the arrangement shown in Fig. 4 is substantially as follows: The degree of saturation of the reactor 30 determines its impedance and thereby the voltage applied to the load 28—29. If the load circuit voltage decreases so that the variable voltage component across resistor 35 is less than the voltage component across tube 17 the grids of valves 15 and 16 are rendered more positive and the valves become conductive. When the valves are rendered conductive the reactor 30 becomes more nearly saturated and its impedance decreases so that the voltage applied to the load circuit increases. Similarly, when the valves become non-conductive the impedance of the reactor tends to rise and thereby lower the voltage at the load circuit. The valves 15 and 16 are rendered conductive intermittently so as to maintain the average excitation of the saturation winding at the proper value to maintain the load circuit voltage at the predetermined value.

Fig. 5 illustrates a simplified arrangement of the embodiment of my invention illustrated in Fig. 4. Since the rectified alternating voltage can ordinarily be chosen at a value higher than the critical break-down voltage of ordinary glow tubes suitable for use in carrying out my invention, the transformer 23 and rectifying means 24 as used in Fig. 4 may be eliminated. In Fig. 5 corresponding elements have been designated by like reference numerals. The transformer 23' is connected across the load circuit and is connected to energize the rectifying means 34. The resistor 35 is connected across the output terminals of rectifier 34 as in Fig. 4 and the electric discharge device 17 and its current limiting resistor 20 are also connected across the same output terminals rather than across the output terminals of rectifying means 24. The cathodes of the valves 15 and 16 are connected to a suitable point on resistor 35 through the adjustable connection 36 and the grids are connected to a point between the tube 17 and resistor 20. The connection of the grid-cathode circuit is so made that the variable voltage component across resistor 35 and the constant voltage component across tube 17 are in voltage opposition.

The operation of the arrangement shown in Fig. 5 will be readily understood from the description of the operation of the arrangement shown in Fig. 4 since the only essential difference between the two arrangements is the manner of maintaining the electric discharge device 17 energized.

While I have shown and described particular embodiments of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. Circuit control means comprising a source of voltage having a voltage component varying in accordance with a condition to be controlled, means including a vapor electric discharge device having a substantially constant voltage component thereacross and connected in series relation with said source of voltage, and means for maintaining said discharge device continuously conductive within the range of variation of said condition to be controlled.

2. Circuit control means comprising a source of voltage having a voltage component varying in accordance with a condition to be controlled, a vapor electric discharge device connected in series relation with said source of voltage and having a voltage component in voltage opposition with said varying voltage component, and a second source of voltage connected to said discharge device for maintaining said discharge device continuously conductive within the range of variation of said condition to be controlled.

3. Circuit control means comprising a source of voltage having a voltage component varying in accordance with a condition to be controlled, a vapor electric discharge device connected in series with said source of voltage and having a voltage component in voltage opposition to said variable voltage component, and means including a second source of voltage connected in series with said first source of voltage and in voltage additive relation therewith for initiating an electric discharge through said discharge device and maintaining said discharge device continuously conductive within the range of variation of said condition to be controlled.

4. In combination, an electric valve provided with a control electrode circuit, means for controlling said valve comprising a source of voltage having a variable voltage component, means including a vapor electric discharge device having a substantially constant voltage component thereacross and connected in series voltage opposition with said source of voltage, means for maintaining said discharge device continuously conductive within the range of variation of said variable voltage component, and means for energizing the control electrode circuit of said valve in accordance with the voltage difference between said varying voltage component and said constant voltage component.

5. In combination, an electric valve provided with a control electrode circuit, means for controlling said valve comprising a source of voltage having a variable voltage component, a vapor electric discharge device connected in series with said source of voltage and having a voltage component in voltage opposition with said variable voltage component, means including a second source of voltage connected in series with said first source of voltage and in voltage additive relation therewith for initiating an electric discharge through said discharge device and maintaining said discharge device conductive, and means for energizing the control electrode circuit of said valve in accordance with the voltage difference between said varying voltage component and said constant voltage component.

6. In a regulating system, a dynamo-electric machine having an armature circuit and an excitation circuit, an electric valve provided with a control electrode circuit for controlling the energization of said excitation circuit, means connected to said dynamo-electric machine for providing a component of voltage varying in accordance with variations in the voltage of said armature circuit, an electric discharge device connected in a circuit including said varying voltage component and having a substantially constant voltage component in voltage opposition thereto, a source of voltage connected to said armature circuit in a circuit including said component of varying voltage in voltage additive relation therewith for initating an electric discharge through said discharge device and maintaining said device continuously conductive within the range of variation of the voltage of said armature circuit, and means for energizing the control electrode circuit of said valve in accordance with the voltage difference between said varying voltage component and said constant voltage component.

7. In a regulating system, a direct current dynamo-electric machine having an armature circuit and an excitation circuit, a source of alternating current, a full wave rectifier comprising a plurality of electric valves each provided with a grid circuit and connected to energize said excitation circuit from said source of alternating current, a resistor connected across said armature circuit, an adjustable connection to said resistor, rectifying means having an input circuit connected to said alternating current circuit and an output circuit connected in series relation with one terminal of said resistor and said adjustable connection and having its output voltage in additive relation with a component of voltage from said resistor, an electric discharge device connected to be energized in accordance with the sum of the voltage component from said resistor and the output voltage of said rectifying means, said electric discharge device having a substantially constant component of voltage thereacross when continuously energized, and means for energizing the grid circuit of each of said valves in accordance with the voltage difference between the varying voltage component from said resistor and the constant voltage component across said discharge device.

8. In combination, an alternating current circuit, variable impedance means connected in said alternating current circuit, means including a winding for controlling said variable impedance means, rectifying means including an electric valve connected between said alternating current circuit and said winding, and means for controlling the conductivity of said valve including means for deriving a voltage component from said alternating current circuit varying in accordance with an electrical characteristic thereof and means connected to said alternating current circuit for producing a substantially constant voltage component including an electric discharge device having a substantially constant voltage thereacross when continuously energized.

9. In combination, an alternating current circuit, a saturable reactor including an alternating current winding connected in circuit with said alternating current circuit and being provided with a direct current saturating winding, a full wave rectifier comprising a plurality of electric valves each provided with a grid circuit and connected to energize said saturating winding, means including rectifying means having an output circuit for deriving a voltage component from said alternating current circuit variable in accordance with the voltage thereof, an electric discharge device connected to be energized from the output circuit of said rectifying means and having a substantially constant voltage component thereacross when continuously energized, and means for energizing the grid circuits of said electric valves in accordance with a differential voltage between said variable voltage component and said constant voltage component.

10. In combination, means subject to variations in an operating condition, means for controlling said first-mentioned means, means for controlling said second-mentioned means comprising a circuit element having a voltage component varying in accordance with said operating condition and current consuming means having a substantially constant voltage component thereacross when in a continuously conductive state and connected in differential voltage relation with said circuit element, an electric circuit having the same character of current as said first-mentioned means for supplying current to said current consuming device, and means entirely static for deriving from said electric circuit a component of direct current voltage sufficient to maintain said current consuming means conductive throughout the operating range of variations of said operating condition.

11. In combination, an electric device having a controlling winding, means including an electronic tube for controlling the energization of said winding, means for controlling the conductivity of said electronic tube comprising a circuit element having a voltage component varying in accordance with an operating condition of said electronic device and an electric discharge device having a substantially constant voltage component thereacross when in a continuously conducting state and connected in differential voltage relation with said circuit element, an electric circuit having the same character of current as said electric device for supplying current to said electric discharge device, and means entirely static for deriving from said electric circuit a component of direct current voltage sufficient to maintain said electric discharge device conductive throughout the operating range of variation of said operating condition.

12. In combination, means subject to variations in an operating condition, means for controlling said first-mentioned means, means for controlling said second-mentioned means comprising a source of voltage having a voltage component varying in accordance with said operating condition and current consuming means having a substantially constant voltage component thereacross when in a continuously conductive state and connected in differential voltage relation with said source of varying voltage, and means for maintaining said current consuming means continuously conductive within the range of variation of said condition to be controlled.

13. In combination, an electric circuit, means for controlling an electrical characteristic of said circuit including a direct current winding, means including an electronic tube for controlling the energization of said direct current winding, means for controlling the conductivity of said electronic tube comprising a source of voltage having a voltage component varying in accordance with said electrical characteristic and an electric discharge device having a substantially constant component thereacross when in a continuously conducting state connected in differential voltage relation with said source of varying voltage, and a second source of voltage for maintaining said discharge device continuously conductive throughout the operating range of variation of said electrical characteristic.

HAROLD T. SEELEY.

CERTIFICATE OF CORRECTION.

Patent No. 2,031,509. February 18, 1936.

HAROLD T. SEELEY.

It is hereby certified that error appears in the printed specification of the above numbered patent requiring correction as follows: Page 3, first column, line 33, for "carrying" read varying; page 4, second column, line 43-44, claim 9, for "therecross" read thereacross; and that the said Letters Patent should be read with these corrections therein that the same may conform to the record of the case in the Patent Office.

Signed and sealed this 31st day of March, A. D. 1936.

Leslie Frazer
Acting Commissioner of Patents.

(Seal)